(12) United States Patent
Wells

(10) Patent No.: US 8,721,490 B2
(45) Date of Patent: May 13, 2014

(54) PLANETARY DRIVE SYSTEM

(75) Inventor: David Wells, Marble Rock, IA (US)

(73) Assignee: Gear Drive ZT, L.L.C., St. Ansgar, IA (US)

(*) Notice: Subject to any disclaimer, the term of this patent is extended or adjusted under 35 U.S.C. 154(b) by 149 days.

(21) Appl. No.: 13/453,520

(22) Filed: Apr. 23, 2012

(65) Prior Publication Data

US 2012/0270695 A1 Oct. 25, 2012

Related U.S. Application Data

(60) Provisional application No. 61/478,712, filed on Apr. 25, 2011.

(51) Int. Cl.
*F16H 3/62* (2006.01)

(52) U.S. Cl.
USPC .......................................... 475/279; 475/286

(58) Field of Classification Search
CPC .............. F16H 3/62; F16H 2200/2012; F16H 2200/2043
USPC .......................................... 475/279, 286, 290
See application file for complete search history.

(56) References Cited

U.S. PATENT DOCUMENTS

| | | | | |
|---|---|---|---|---|
| 6,139,463 A * | 10/2000 | Kasuya et al. | ................ | 475/275 |
| 2007/0225109 A1* | 9/2007 | Jang | .............................. | 475/280 |
| 2008/0015083 A1* | 1/2008 | Chang et al. | .................. | 475/286 |
| 2008/0312026 A1* | 12/2008 | Kim | .............................. | 475/286 |
| 2008/0318726 A1* | 12/2008 | Matsubara et al. | ............... | 477/3 |

* cited by examiner

*Primary Examiner* — Edwin A Young
(74) *Attorney, Agent, or Firm* — Zarley Law Firm, PLC

(57) ABSTRACT

A planetary drive system that has an input and a gear housing that is connected to a speed control system. A cross connecting shaft is drivingly engaged by the speed control system and rotatably connects to a forward and reverse gear set that is drivingly connected to a reduction gear set to provide an output. The speed control system, forward and reverse gear set, and reduction gear set are actuated by band clutch elements that frictionally engage the exterior of ring gears and carriers within the system to control the operation of the planetary drive system.

12 Claims, 5 Drawing Sheets

US 8,721,490 B2

PLANETARY DRIVE SYSTEM

CROSS REFERENCE TO RELATED APPLICATION

This application claims the benefit of U.S. Provisional Application No. 61/478,712 filed Apr. 25, 2011.

BACKGROUND OF THE INVENTION

This invention relates to a planetary drive system for a vehicle. Specifically, this invention relates to a transmission used to power vehicles that steer by changing the speed of the wheels on one side of the vehicle relative to the wheels on the other side of the vehicle.

Typically, in lawnmowers, skid loaders and the like have vehicle steering that allows the changing of wheel speed on one side of the vehicle relative to the other and in some instances one side can actually be reversed while the other side travels forward such that the vehicle can execute a zero turn. This is commonly accomplished by using three different differentials. They are often times powered by hydraulic motors or pumps. Specifically, lawnmowers use a pair of hydraulic motors wherein one motor is attached to one side wheel and the other is attached to another side wheel. The motors can be reversed and speed adjusted to control the vehicle.

These systems are complicated and expensive. The most cost effective method of powering a lawnmower is by use of a transaxle. A transaxle is a box containing the gears to drive the machine at the required speed. The transaxle has a single input that is usually a pulley driven by the engine and a pair of axles that attach directly to the wheels of the machine. Thus, no chains or external gear boxes are required.

A disadvantage of using hydraulic drives and other methods is the attempt to synchronize the two drives when it required that the vehicle travel in a straight line. Lack of mechanical connection causes drift and constant adjustment to the travel direction is required by the operator. Other disadvantages of the hydraulic drives are the waste of power due to losses required to circulate the oil. In addition, internal leakage leads to loss of efficiency. Further, the hydraulic drives have a tendency to sustain damage when started in very cold temperatures and additionally the motor can sustain damage when the vehicle is moved with the engine turned off.

Additional disadvantages of current systems include that the available torque from the motors is too low to directly drive the transaxle to the wheel and a secondary speed reduction system must be used between the hydraulic motor and the axle. If this is not done, a large motor must be used. Unfortunately, the savings offered by the small motor is often offset by the requirement of employing a gear reduction to increase the torque. Thus, a need in the art exists for alternative methods to using such hydraulic motors that are presently within the art.

Thus, a principle object of the present invention is to provide a gear drive system for providing a zero turn transmission.

Yet another object of the present invention is to provide an inexpensive method of manufacturing the gear drive system.

Another object of the present invention is to provide a gear drive system that is both inexpensive and easy to manufacture.

BRIEF SUMMARY OF THE INVENTION

A planetary drive system having an input that is disposed within a gear housing and is connected to a speed control system. A cross connecting shaft is drivingly engaged by the speed control system and is rotatably connected to a forward and reverse gear set. A reduction gear set is drivingly connected to the forward and reverse gear set and rotatably connected to an output.

DETAILED DESCRIPTION OF THE PREFERRED EMBODIMENT

Figure 1:
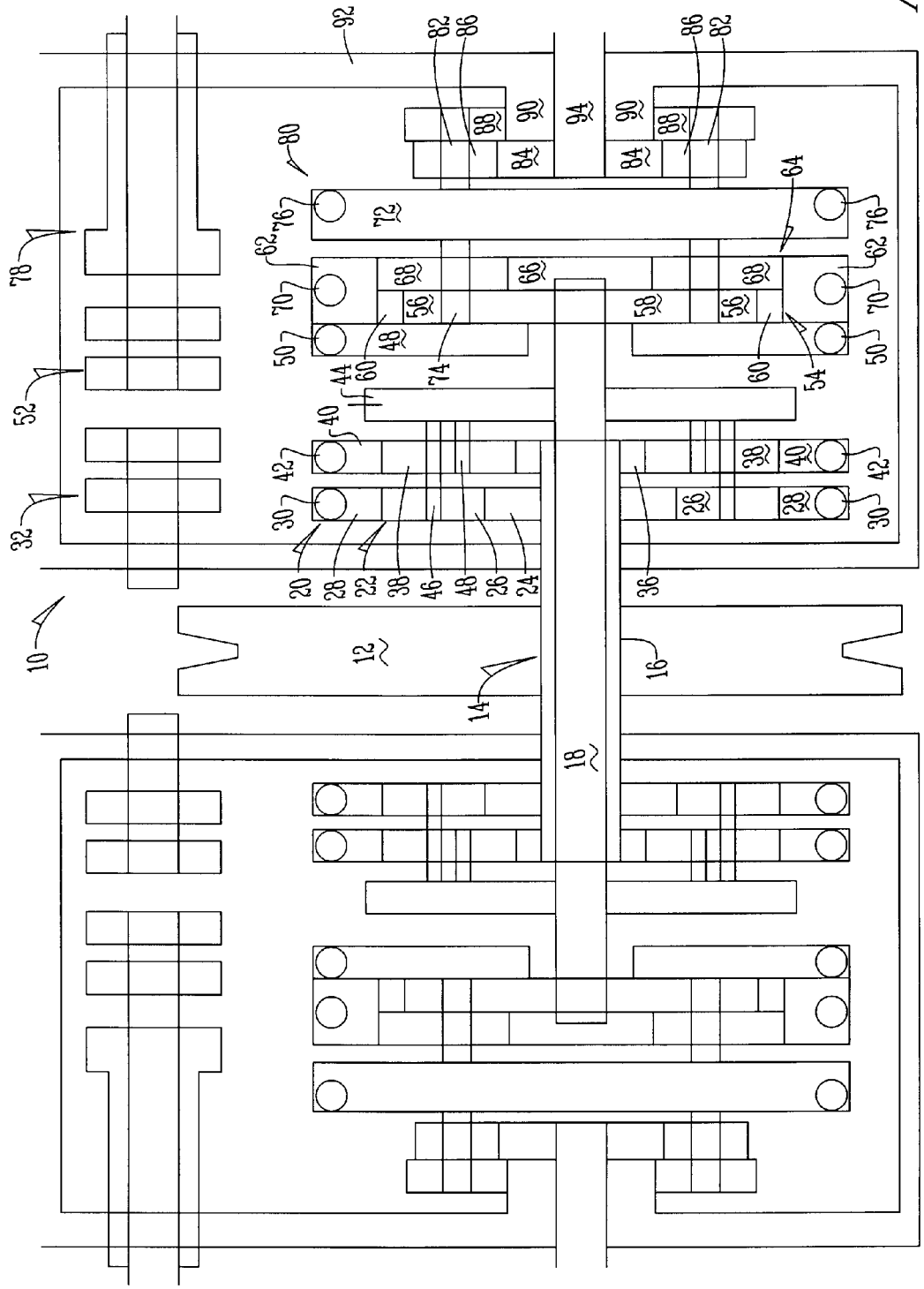
FIG. 1 is a side plan view of a planetary drive system.
Figure 2:
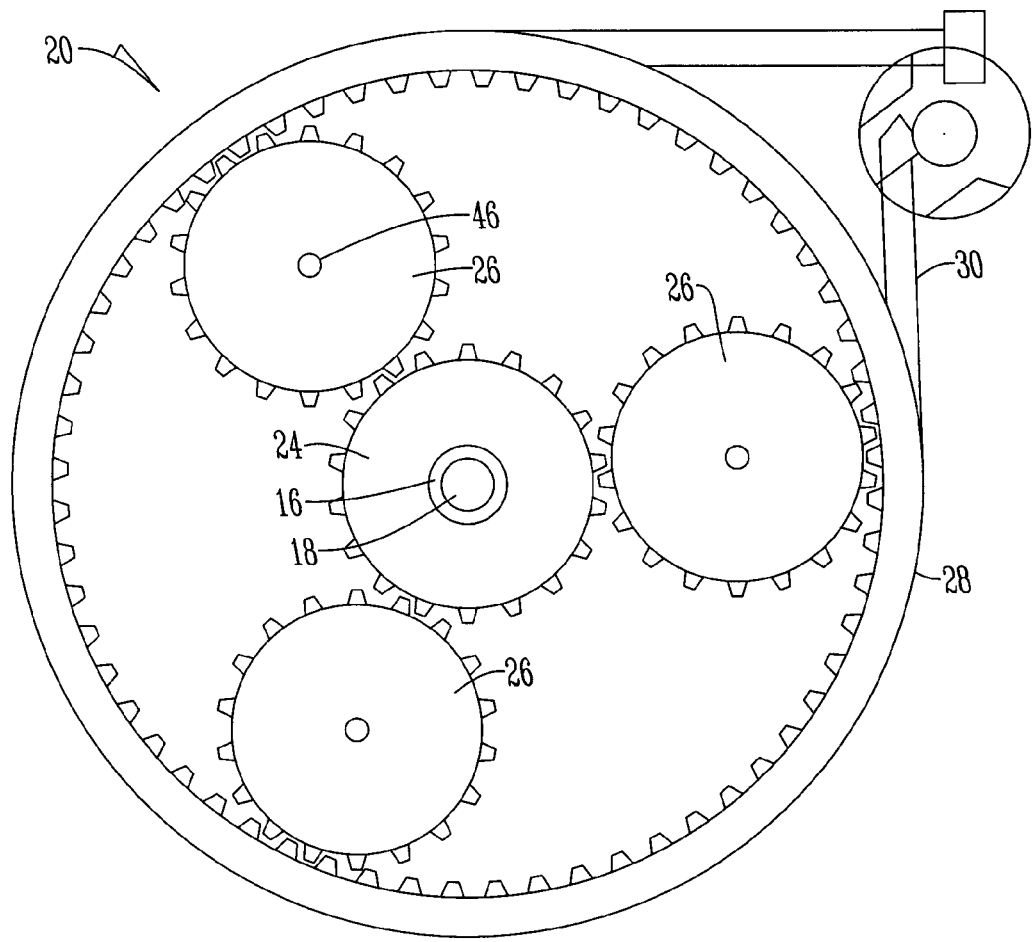
FIG. 2 is a side plan view of a first section of a planetary drive system.
Figure 3:
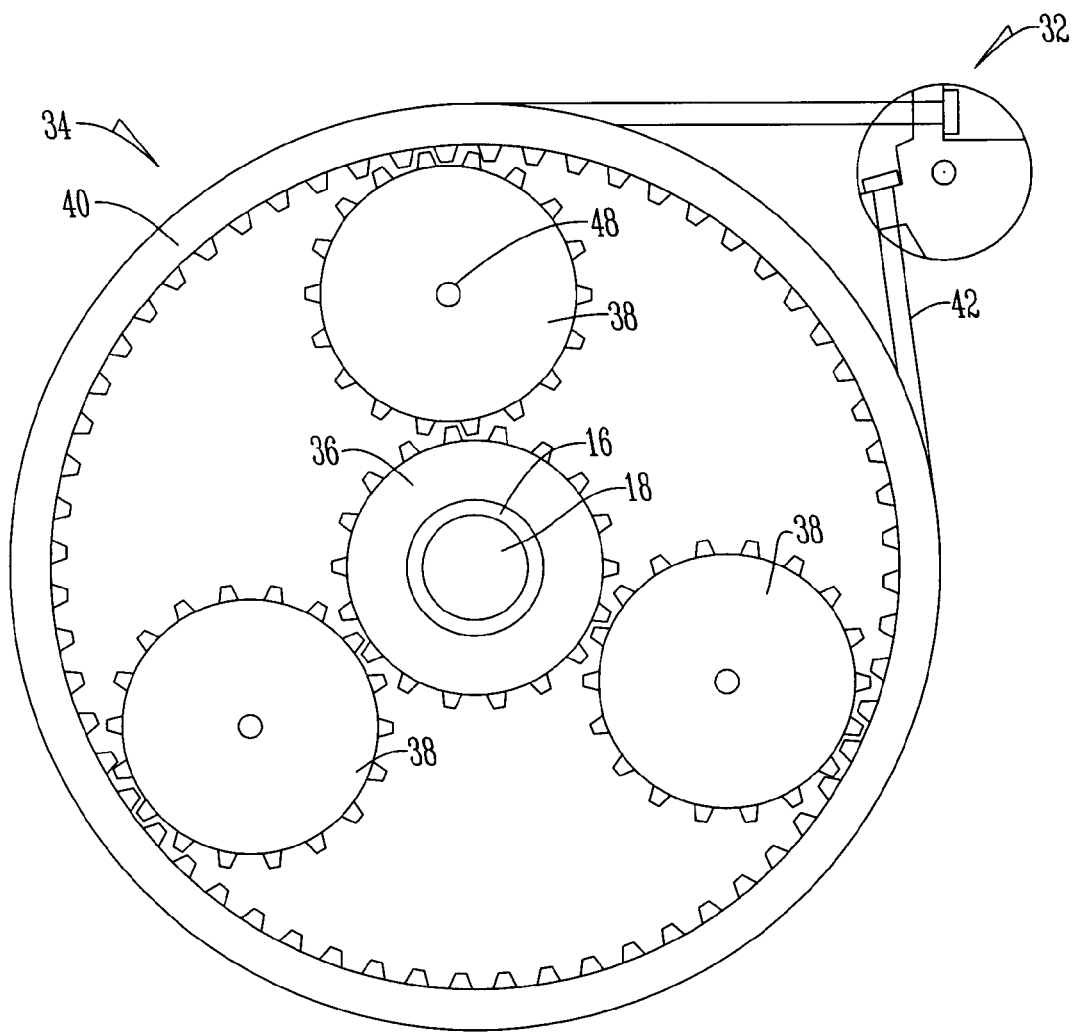
FIG. 3 is a side plan view of a second section of a planetary drive system.
Figure 4:
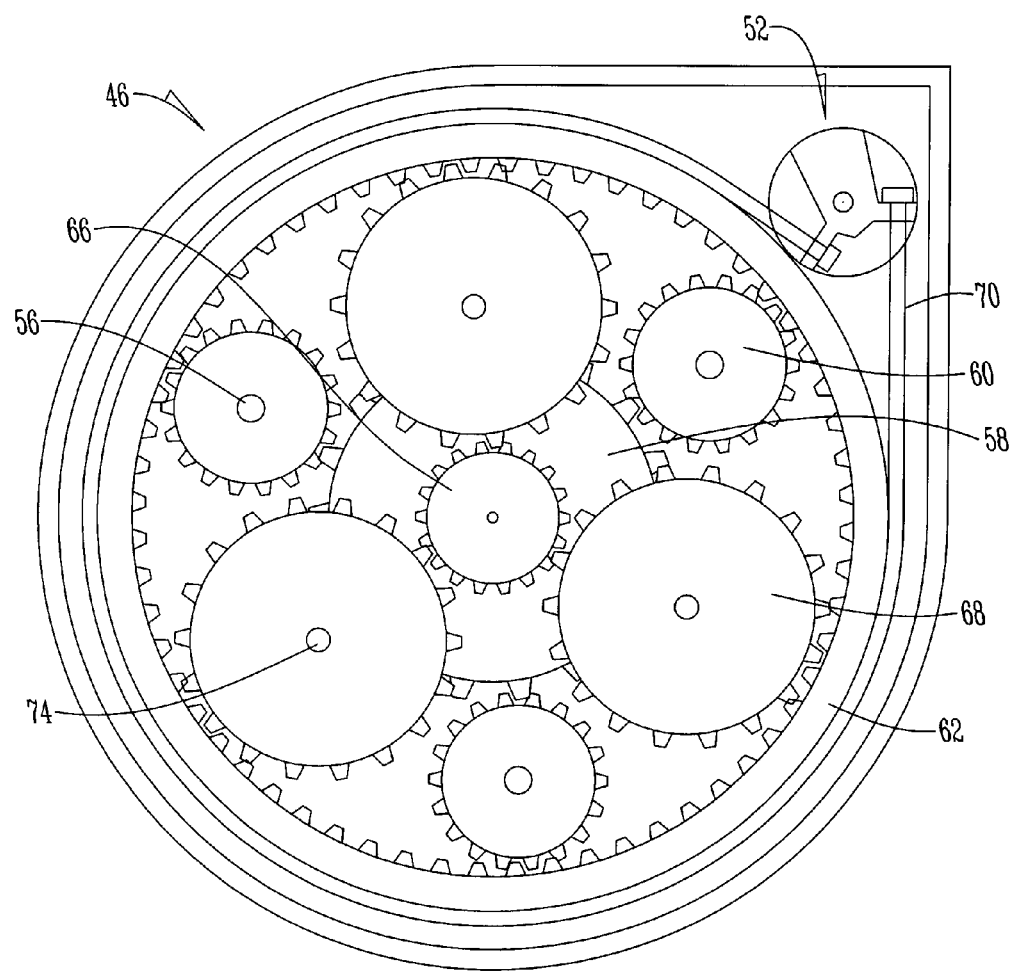
FIG. 4 is a side plan view of third and fourth section of a planetary drive system.
Figure 5:
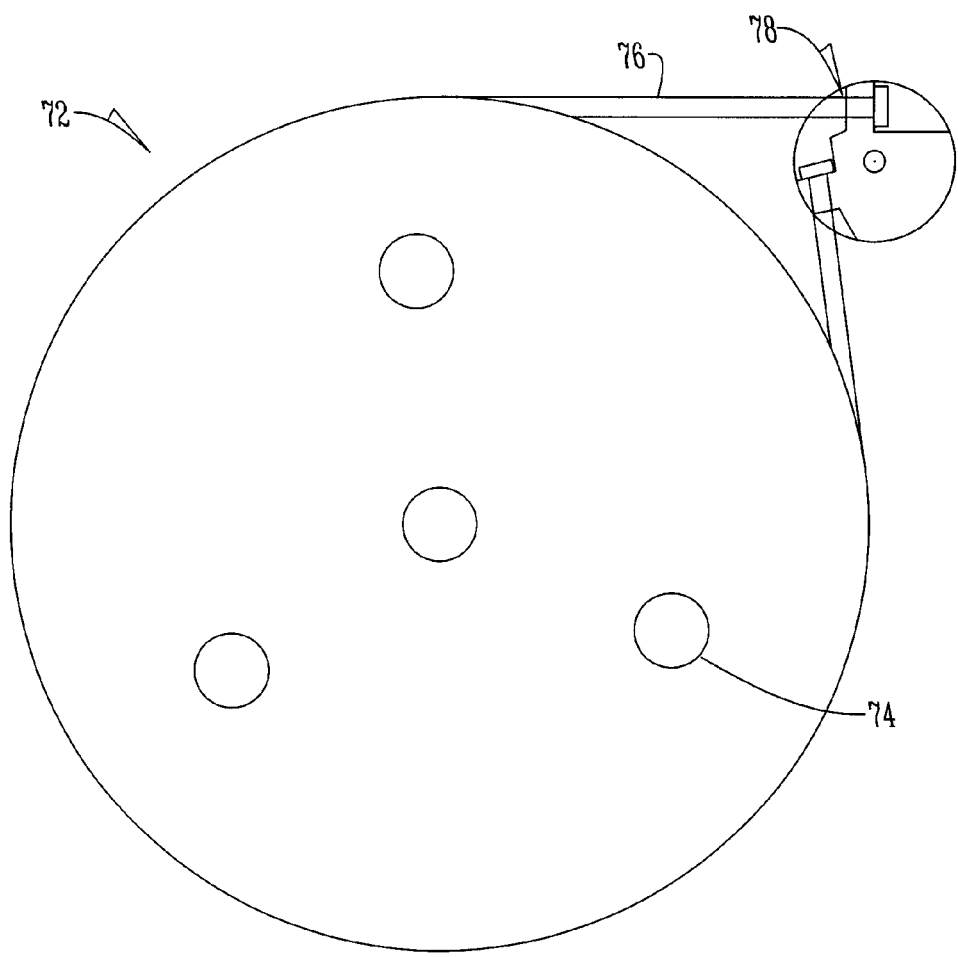
FIG. 5 is a side plan view of a carrier within the planetary drive system.

The figures show components of a gear drive system 10 utilized to drive the wheels of a vehicle such as a lawnmower, skid loader, and the like. The system 10 includes an engine or electric motor (not shown) that provides an input 12 into a transaxle 14. The input 12 is not specific. It can be a pulley, a chain, a gear or a continuously variable drive system. Fixed connections to shafts can be splines or keys or tapers, which ever type suits the application. Snap rings and set screws may also be used. For clarity, these devices are not shown.

The input 12 drives and is mounted to the tubular cross shaft 16 that surrounds cross shaft 18 and which drives a speed control gear set 20. The gear set 20 has a first section 22 having a sun gear 24 that meshingly and drivingly engages a planet gear 26 that meshingly engages a ring gear 28. A first clutch element 30 is disposed around the ring gear 28 and is connected to a first actuator 32 such that when the first actuator 32 is rotated in a first direction the first clutch element frictionally engages the ring gear 28 to prevent rotational movement of the ring gear 28.

A second section 34 of the speed control gear set 20 similarly has a sun gear 36 that meshingly and drivingly engages a planet gear 38 that meshingly engages a ring gear 40. A second clutch element 42 is disposed around the ring gear 40 and is connected to the first actuator 32 such that when the first actuator 32 is rotated in a second direction opposite the first direction, the second clutch element 42 frictionally engages the ring gear 40 to prevent rotational movement of the ring gear 40. In a preferred embodiment the sun gear 24 of the first section 22 has a diameter twice the length of the diameter of the sun gear 36 of the second section 34. In this manner the speed control gear set 20 provides different speeds depending upon which clutch 30 or 42 is actuated.

A first carrier 44 is mounted to and drives cross shaft 18 and has pin elements 46 and 48 that connect to the first and second sections 22 and 34. Therefore, the planet gears 26 and 38 are mounted to separate sets of pins 46 and 48 mounted to carrier 12 and rotate within ring gears 28 and 40 respectfully, that are each engaged by clutch elements 30 and 42 respectfully. The carrier 44 is thus referred to as a common carrier because two separate sets of planets 26 and 38 are mounted to the carrier 44.

A forward and reverse gear set 46 is rotatably and drivingly connected to the cross shaft 18 that is driven by first carrier 44. The forward and reverse gear set 46 includes a second carrier 48 that has a third clutch element 50 disposed around its perimeter. The third clutch element 50 is connect to and actuated by a second actuator 52 that when actuated rotates in a first direction to cause the third clutch element to frictionally engage the second carrier 48 to prevent rotation of the second carrier 48. The second carrier 48 is also connected to a third section 54 by a pin element 56. The third section 54 includes a sun gear 58 that rotates a planet gear 60 that is meshingly engaged by and revolves in double ring gear 62. The third section 54 via the pin element 56 is connected to a fourth section 64 that similarly has a sun gear 66 and a planet gear 68. The planet gear 68 also meshingly engages and revolves in the double ring gear 62.

A fourth clutch element 70 is disposed around the double ring gear 62 and is connected to the second actuator 52. Thus, when the second actuator 52 is rotated in a second direction opposite the first direction, the fourth clutch element 70 frictionally engages the double ring gear 62 to prevent rotational movement of the double ring gear 62.

A third carrier 72 is connected to the third and fourth sections 54 and 64 via pin elements 74. Thus the planet gears 68 are mounted to the double ring gear 62 side of the third carrier 72 on pin elements 74 for bearings in planet gears 68. A fifth clutch element 76 is disposed around the third carrier 72 and is attached to a third actuator 78 that surrounds the second actuator 52. When the third actuator 78 rotates the fifth clutch element 76 frictionally engages the third carrier preventing rotational movement of the third carrier and thus brakes the system 10.

A reduction gear set 80 is connected to the third carrier 72 via pin elements 82. The reduction gear set 80 includes a sun gear 84 the meshingly rotates primary planet gears 86 that receive the pin elements 82. The primary planet gears 86 via the pin elements 82 are connected to secondary planet gears 88 that rotate about a stationary sun gear 90 that is secured to the gear box housing 92 to prevent movement of the stationary sun gear 90. In this manner gear reduction is realized such that an output 94 driving and rotatably connected to the sun gear 84 rotates the wheel of a vehicle at a desired rate. Thus third carrier 72 is equipped with pin elements 82 for bearings for gears 86 and 88 that are connected together and revolve as one. In addition, stationary sun gear 90 is mounted to the wall of the gear box housing 92 and secondary gears 88 orbit the stationary sun gear 90 to drive gear sun gear 84 that is fixed to and drives output shaft 94. The system as indicated has a plurality of clutch elements 30, 42, 50, 70 and 76 that are controlled by a plurality of actuators 32, 52 and 78. In one embodiment the clutch elements are clutch bands that comprise a conventional flat structure. In a preferred embodiment the clutch elements are round rods with threaded ends for adjustment. The rods have a circular cross section and rest within exterior grooves of the ring gears 28, 40 and 62 and carriers 48 and 72. Therefore actuator 32 activates clutch band 30 in one direction and clutch band 42 in the other direction. This selects the speed the system rotates. Actuator 52 meanwhile controls clutch bands 50 and 70 such that when actuator 52 activates clutch band 50, reverse is supplied. In opposite, when actuator 52 activates clutch band 70, forward is supplied. Actuator 78 controls brake band 76 such that when brake band 76 is activated, output shaft 94 is braked. Actuator 78 in one embodiment is made tubular and rotates about actuator 52.

Actuator shafts 32, 52, and 78 extend through the walls of the case housing 92 of the gear boxes and are connected to suitable levers to control the machine. Spring action of all bands is used to return the control levers to the neutral position when released.

The right and left side gear boxes are identical mirrors of each other with the exception of the speed control gear sets 20. Each side will have different ratios to provide four separate speeds to the input.

In operation, the transmission 10 begins with an input drive 12 connected to an engine or electric motor. The power flows first to a speed control section 20. There are four speeds forward and reverse provided by planetary reduction sets of different reduction ratios selected to meet the desired operating requirements.

The transmission 10 is divided into two separate gear boxes that directly connect to the wheels of the vehicle. Two of the speed ratios are mounted in one side box and the other two speed ratios in the second gear box. The speed control sections 22 and 34 send power to the forward reverse sections 54 and 64. The forward and reverse sections 54 and 64 of the transmission have forward and reverse planetary gear sets. The forward reverse sections 54 and 64 provide input to a final speed reduction planetary reverted four gear set 80.

The reduction gear set 80 provides output 94 from the gear box directly to the wheel. The reduction gear set 80 is made with a stationary gear 90 mounted to the wall of the case housing 92 that is orbited by a planetary gear 88 that is connected to a primary planetary gear 86 that drives a gear 84 connected to the output shaft 94. This particular gear train can be configured to provide high ratio reductions and allows the input rpm of the engine to be directly converted to the desired output rpm. There are some 20,000,000 ratios that can be selected using the various numbers of teeth in the gear train.

The forward and reverse gear set 46 uses a pair of sun gears 58 and 66 connected together and driven by the input 18 to the set 46. In one embodiment the first sun gear 58 has twice the number of teeth as the second sun gear 66. A pair of ring gears referred to as a double ring gear 62, which connected together can be one gear, engages separate planetary gears 60 and 68 that couple the respective sun gears 58 and 66 to the ring gears 62. It will be noted that both the sun gears 58 and 66 and the ring gears 62 of the forward reverse set 46 are connected together. The planet carriers 48 and 72 are separate. The double ring gear 62 is provided with a clutch band 70 that surrounds the outside of the ring gear 62. The band 70 allows the ring gear 62 to rotate freely as the planets 60 and 68 turn or will stop the ring gear 62 rotation when the band 70 is applied.

A pair of carriers 48 and 72 are provided to control the planet gears 60 and 68 of the forward reverse set 46. The first carrier 48 is mounted free to rotate about the input shaft 18 and the outer rim of the carrier disc is provided with a control clutch band 50. The pins 56 of the carrier are provided with suitable bearings to control the planet gears 60 of the third section 54. If the carrier 48 is allowed to rotate by releasing the clutch band 50, the carrier 48 rotates but does not drive anything. If the band 50 is applied, the carrier 48 stops rotating and the double ring gear 62 is forced to rotate in the reverse direction.

Stopping the carrier 48 of the third section 54, causes the fourth section 64 to drive the intermediate carrier 72 in reverse. The intermediate carrier 72 is a carrier designed with planet gears 60, 68, 86 and 88 on both sides of the disc. The carrier 72 provides coupling of the forward reverse gear set 46 to the reduction gear set 80. The intermediate carrier 72 is also mounted free to rotate about the central shaft 18. The central drive shaft 18 in one embodiment can be extended to provide the bearing for the intermediate carrier 72 or the output shaft 94 can be extended to provide the bearing.

If the ring gear 62 of the forward reverse set 46 is stopped, the intermediate carrier 72 is driven in the forward direction.

If the two sun gears 58 and 66 of the forward reverse gear set 46 has a ratio of two to one, the forward speed is the same as the reverse speed.

The control actuator 52 activates one band 50 or 70 but not both with neutral in the middle position. The intermediate carrier 72 is provided with pins 74 and 82 for bearings for planet gears on both sides of the disc. The outer rim of the intermediate carrier disc is also provided with a band 76 that acts as the brake and stops the final output shaft 94 from rotating.

The pins 74 on the ring gear side of the intermediate carrier 72 engage the planetary gears 60 or 68 of the forward and reverse gear set 46. The pins 82 on the output side of the intermediate carrier 72 control the planets 86 and 88 of the reduction gear set 80 that drives the final output shaft 94. These planetary gears 86 and 88 are actually two separate gears connected together axially. A plurality of the gears may be used to increase the strength of the drive. A two to one ratio of teeth in the sun gears causes the reverse speed to be the same as the forward speed.

Planetary gear sets that use ring gears have a practical limit to the reduction ratio that can be obtained with a single set of about 6 to 1. The higher the ratio the smaller the sun gear must be. The smaller the sun gear the less power can be transferred through the set.

If the sun gear be enlarged the planets must be reduced. Therefore the optimum power capacity of gear sets using the same tooth pitch and ring gear size will have the sun gear nearly the same size as the planets. A ratio of 4 or 5 to one will have a lot more torque capacity because of the increased size of the sun gear.

The planetary reverted 4 gear train, or reduction gear set 80 with no ring gear enjoys an almost unlimited selection of gear ratios and can be used as the final reduction. The final drive gear to the wheel can be much larger than can be used in a ring gear planetary set.

The zero turn application of the device uses two complete units described. One set drives the left side of the vehicle, the other drives the right. The band control device is configured to operate two bands at a time. Because of this it is desirable to have two separate gear boxes, one for the left side wheel and one for the right side wheel. Because of the need to have different operating speeds required by different operating conditions, a means to change the overall input speed to the drive is required in some cases.

This can be accomplished by adding two extra planetary reduction sets to the input to the forward reverse section of each side gear box. The two sets are controlled by the same design band actuator. The actuator selects one band or the other with neutral in the middle of the lever stroke.

The gear ratios on the left side gear box can be ratios 1 and 2. The gear ratios on the right side gear box can be 3 and 4. This will supply 4 speeds forward and 4 speeds reverse. The ideal handling is achieved if the steering speed increases in direct proportion to the travel speed. Because the steering is controlled by the speed of the wheels, all is proportional. When a higher gear is selected the steering speed increases in proportion to the ground speed.

The sun gears 24 and 36 of the speed selection gear set 20 are connected in common to a tubular cross shaft 16 that terminates inside each of the two gear boxes. Two ring gears 28 and 40 of the two planetary sections 22 and 34 in each gearbox are supplied with two separate control bands operated by the actuator 32 that activate one or the other but not both with a neutral middle position. This tubular cross shaft 16 rotates around the central cross shaft 18 that connects the sun gears 58 and 66 of the forward reverse gear set 46.

The planets of the two planetary gear sets are mounted on common carriers. The speed control carriers 48 of the right side gearbox and the left side gear box are mounted to and drive the central cross shaft 18 that connects the sun gears 58 and 66 of the forward reverse gear set 46. The sun gears 58 and 66 and the carriers 48 are connected in the speed control gear set 46 and the ring gears 62 are separate with separate clutch bands 50 and 70 for control.

The input 12 to the whole system in one embodiment is mounted to the tubular drive shaft 14 that drives the speed selecting planetary gear sets 20. If a continuously variable drive system is used for the input 12, the 4 speed selector gear set 20 can be eliminated and the drive would then be connected to the central cross connecting drive shaft 18 that powers the forward and reverse planetary gear sets.

The band control actuators 32, 52, and 78 are mounted concentric to each other and the shafts project out of the gear boxes and are connected to the control levers or servos. If servos are used they can be built into the gear boxes. A typical arrangement would have the brake actuator 78 be a tubular shaft surrounding the shaft to the forward reverse section actuator 52 extend out of the output side of the gear box. The speed selector actuator shaft 32 would extend out of the input side of the gear box. The speed selector lever mechanism may be provided with a detent device to "lock" it into gear so the operator does not have to hold the lever. Neutral is then supplied by the forward, reverse section.

Zero turn mowers of typical design mount the vertical shaft engine on the rear of the machine behind the drive wheels. The use of two separate gear boxes mounted near each wheel provides a space between the gear boxes for the V-belt that drives the mower deck to pass from the motor to the deck. If gear boxes were in the way, a more bulky design would be required. This feature allows an optimum front to back weight distribution. This is critical to how the mower handles on hills and slopes.

A small 90 degree gearbox drive mounted in the central space aligns the V-belt drive to the engine. The mower deck drive V-belt can be mounted just above or below the 90 degree gear box pulley and pass to the mower deck.

Because there is no requirement to stop the input to the transaxle for neutral it would be possible to equip the mower deck itself with an electric shutoff clutch and brake device. The V-belt drive could then power both the trans axle and the mower deck. The belt pulleys would turn with the engine all the time and the deck would be shut off and turned on with the deck mounted electric clutch. Thus provided would be a lawn mower that only uses one V-belt. Electric clutch brake assembles are available and are usually mounted on the engine. If the assembles are mounted on the blade deck, only one V-belt would be required.

This system is superior to belt tightening and releasing systems because the belt maintains proper tension and does not undergo slippage when the devices start and stop. They provide a faster safer blade brake. The electric control feature eliminates troublesome linkages. The transaxle has its own clutches internal. By combining the two drives, a lower profile machine can be built. This makes the machine safer on hills and slopes.

Thus presented is a system of gears and clutches designed to steer a zero turn lawn mower. The system is a transaxle style transmission that is reliable and low in cost. The combination of the ring gear forward reverse section with the 4 gear train final reduction set provides a compact durable speed reduction unit that can be configured to provide any desired reduction ratio between the engine and the wheels.

What is claimed is:

1. A planetary drive system comprising:
   an input within a gear housing and connected to a speed control gear set that comprises a first section having a sun gear engaged to and driven by a cross shaft and meshingly connected to and driving a planet gear that meshingly engages a ring gear;
   a first clutch element disposed around the ring gear and connected to a first actuator such that when the first actuator is rotated in a first direction the first clutch element frictionally engages the ring gear to prevent rotational movement of the ring gear;
   a cross connecting shaft drivingly engaged by the speed control gear set and rotatably connected to a forward and reverse gear set; and
   a reduction gear set drivingly connected to the forward and reverse gear set and rotatably connected to an output.

2. The system of claim 1 wherein the speed control gear set further comprises a second section having a sun gear engaged to and driven by the cross shaft and meshingly connected to and driving a planet gear that meshingly engages a ring gear.

3. The system of claim 2 further comprising a second clutch element disposed around the ring gear of the second section and connected to the first actuator such that when the first actuator is rotated in a second direction the second clutch element frictionally engages the ring gear of the second section to prevent rotational movement of the ring gear of the second section.

4. The system of claim 3 further comprising a first carrier surrounding and engaging the cross connecting shaft and having a first pin element attached to the first section and a second pin element attached to the second section.

5. The system of claim 4 wherein the forward and reverse gear set comprises a second carrier connected to third and fourth sections via pin elements.

6. The system of claim 5 wherein a third clutch element is disposed around the second carrier and connected to a second actuator such that when the second actuator is rotated in a first direction the third clutch element frictionally engages the second carrier to prevent rotational movement of the second carrier.

7. The system of claim 6 wherein the third section has a sun gear that drives a planet gear that meshingly engages a double ring gear and the fourth section has a sun gear that drives a planet gear that meshingly engages the double ring gear.

8. The system of claim 7 further comprising a fourth clutch element disposed around the double ring gear and connected to the second actuator such that when the second actuator is rotated in a second direction the fourth clutch element frictionally engages the double ring gear to prevent rotational movement of the double ring gear.

9. The system of claim 8 further comprising a third carrier having a first pin element securing the third carrier to the forward and reverse gear set and a second pin element securing the third carrier to the reduction gear set.

10. The system of claim 9 further comprising a fifth clutch element disposed around the third carrier and connected to a third actuator such that when rotated the fifth clutch element frictionally engages the third carrier to prevent the rotation of the third carrier and output.

11. The system of claim 10 wherein the reduction gear set has a stationary gear fixed to the gear housing orbited by a set of gears that are connected via pin elements to planetary gears that meshingly engage a sun gear that engages and drivingly rotates the output.

12. The system of claim 2 wherein the sun gear of the first section has a diameter that is twice the diameter of the sun gear of the second section.

\* \* \* \* \*